(12) United States Patent  
Junk

(10) Patent No.: US 9,124,999 B2
(45) Date of Patent: Sep. 1, 2015

(54) METHOD AND APPARATUS FOR WIRELESS COMMUNICATIONS IN A PROCESS CONTROL OR MONITORING ENVIRONMENT

(75) Inventor: Kenneth W. Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 681 days.

(21) Appl. No.: 13/416,876

(22) Filed: Mar. 9, 2012

(65) Prior Publication Data
US 2012/0230309 A1 Sep. 13, 2012

Related U.S. Application Data

(60) Provisional application No. 61/450,964, filed on Mar. 9, 2011.

(51) Int. Cl.
*H04W 4/00* (2009.01)
*G05B 19/418* (2006.01)
*H04L 29/08* (2006.01)

(52) U.S. Cl.
CPC .......... *H04W 4/001* (2013.01); *G05B 19/4186* (2013.01); *H04L 67/12* (2013.01)

(58) Field of Classification Search
None
See application file for complete search history.

(56) References Cited

U.S. PATENT DOCUMENTS 8,194,632 B2 * 6/2012 Lin .............................. 370/338
8,872,916 B2 * 10/2014 Alberth, Jr. ................... 348/143
2007/0280144 A1 12/2007 Hodson et al.
2009/0013064 A1 * 1/2009 Taylor et al. ................... 709/223
2010/0076612 A1 * 3/2010 Robertson ..................... 700/286
2012/0215488 A1 * 8/2012 Carter et al. ................... 702/182

OTHER PUBLICATIONS

Gustafsson, David, "WirelessHART—Implementation and Evaluation on Wireless Sensors," http://www.ee.kth.se/php/modules/publications/2009/XR-EE-RT%202009:003.pdf, Aug. 16, 2010.
Miorandi, D., et al., "A Wireless Extension of Profibus DP Based on the Bluetooth Radio System," Ad Hoc Networks, vol. 3, No. 4, pp. 479-494, 2005.
International Search Report for PCT/US2012/023826, dated Jun. 6, 2012.
Written Opinion for PCT/US2012/023826, dated Jun. 6, 2012.
International Preliminary Report on Patentability for Application No. PCT/US2012/023826, dated Sep. 10, 2013.

* cited by examiner

*Primary Examiner* — Phirin Sam
(74) *Attorney, Agent, or Firm* — Marshall, Gerstein & Borun LLP

(57) ABSTRACT

A method in a communication device that implements a communication stack to wirelessly communicate with a remote device according to a general purpose wireless communication protocol, where the remote device operates in a process control environment, includes receiving a request from a software module to establish a wireless communication link with the remote device, establishing a direct connection between the software module and the communication stack, where the direct connection is free of intermediate services, and communicating process data between the software module and the remote device in accordance with an industrial automation protocol over the wireless communication link, where the wireless communication link utilizes the general purpose wireless communication protocol.

26 Claims, 5 Drawing Sheets

METHOD AND APPARATUS FOR WIRELESS COMMUNICATIONS IN A PROCESS CONTROL OR MONITORING ENVIRONMENT

CROSS-REFERENCE TO RELATED APPLICATION

This application claims benefit of U.S. Provisional Patent Application No. 61/450,964, entitled "Method and Apparatus for Wireless Communications in a Process Control or Monitoring Environment," filed Mar. 9, 2011, the disclosure of which is hereby expressly incorporated herein by reference.

FIELD OF THE INVENTION

The present invention relates generally to process control networks and, more particularly, to operating field devices via a portable device.

DESCRIPTION OF THE RELATED ART

Operators who configure, monitor, and troubleshoot automated process control systems, such as those used in chemical or petroleum process plants, often use handheld or otherwise portable field maintenance devices to access system components in the field. Typically, systems for controlling and/or monitoring processes include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol (e.g., FOUNDATION Fieldbus Version 5.1) or the HART® protocol (the version ratified by International Electrotechnical Commission as IEC 62591 in April 2010, for example) may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant.

Field devices and other equipment may be analyzed locally in the field using handheld field maintenance devices such as Emerson 475 Communicator, for example, or using software applications running on general-purpose portable devices such as smartphones or personal digital assistants (PDAs). For example, ValveLink Mobile software from Emerson Process Management can be executed on a portable device and provides set up, calibration, and troubleshooting functionality. In general, operators find wireless connections to be convenient for most applications, although some devices support both wired and wireless communications.

Typically, a portable device establishes a wireless connection for transferring process control or diagnostic information to and from a field device according to a certain industrial automation protocol (such as HART or Fieldbus) using a virtual serial ("COM") port. More specifically, the portable device includes a wireless communication stack that supports wireless communications according to a certain standard such as Bluetooth®. Emulation software supports virtual COM port functionality to serve as an interface between applications running on the portable device and the communication stack. Accordingly, a software application that supports COM communications connects to a virtual COM port using the emulation software and transmits and receives data via a wireless communication link without directly interacting with the communication stack.

However, communication via a virtual COM port requires a significant configuration effort. For example, to configure an application on a portable device to exchange HART messages with a field device via Bluetooth, a user must turn on the Bluetooth radio of the portable device, pair up the portable device with a HART modem coupled to the field device, establish an outbound virtual COM port associated with the paired field device, direct the application to associate the virtual COM with the paired field device. Moreover, after the application completes the message exchange with the paired field device, the user must remember to turn off the Bluetooth radio.

SUMMARY

In some embodiments, a software application establishes a wireless communication link for exchanging process control and/or monitoring data with a remote device by accessing the appropriate communication stack without opening a virtual COM port. The software application may run on a portable device such as a smartphone, a PDA, etc. To access the communication stack in this manner (referred to herein as "direct access"), the application may invoke one or several application programming interface functions (APIs) for direct manipulation of the communication stack (hereinafter, "communication APIs"). Depending on the embodiment, the communication APIs correspond to synchronous or asynchronous function calls. For example, the communication APIs may allow the application to directly invoke functions associated with the communication stack so that the invoked functions are in the call stack of the application. Alternatively, the communication APIs allow the application to interact with a service, implemented as a separate task (e.g., a process, a thread), that services the communication stack.

The communication stack may provide short-range wireless communications according to a communications standard such as Bluetooth or Infrared Data Association (IrDA), for example. Depending on the embodiment, the communication stack is provided as a component of the operating system of the portable device or as a separately provided software component such as the WIDCOMM Bluetooth stack by Broadcom Corporation or the Bluetooth stack by the Microsoft Corporation. The communication stack may be provided via a set of standard APIs.

The software application in some embodiments invokes functions associated with the communication stack directly or via communication APIs built into the code of the application. In another embodiment, the communication APIs are provided as a separately installable component such as a dynamic-link library (DLL), for example.

In some embodiments, the communication APIs enable the application to establish a wireless communication link with the remote device that operates according to a communication protocol that supports commands and/or information elements specifically defined for conveying process control and/or monitoring information, such as HART, for example.

DETAILED DESCRIPTION OF THE DRAWINGS

FIG. 1. illustrates an example process control system in which a portable communicator that implements the techniques of the present disclosure can be used;

DETAILED DESCRIPTION

Figure 1:
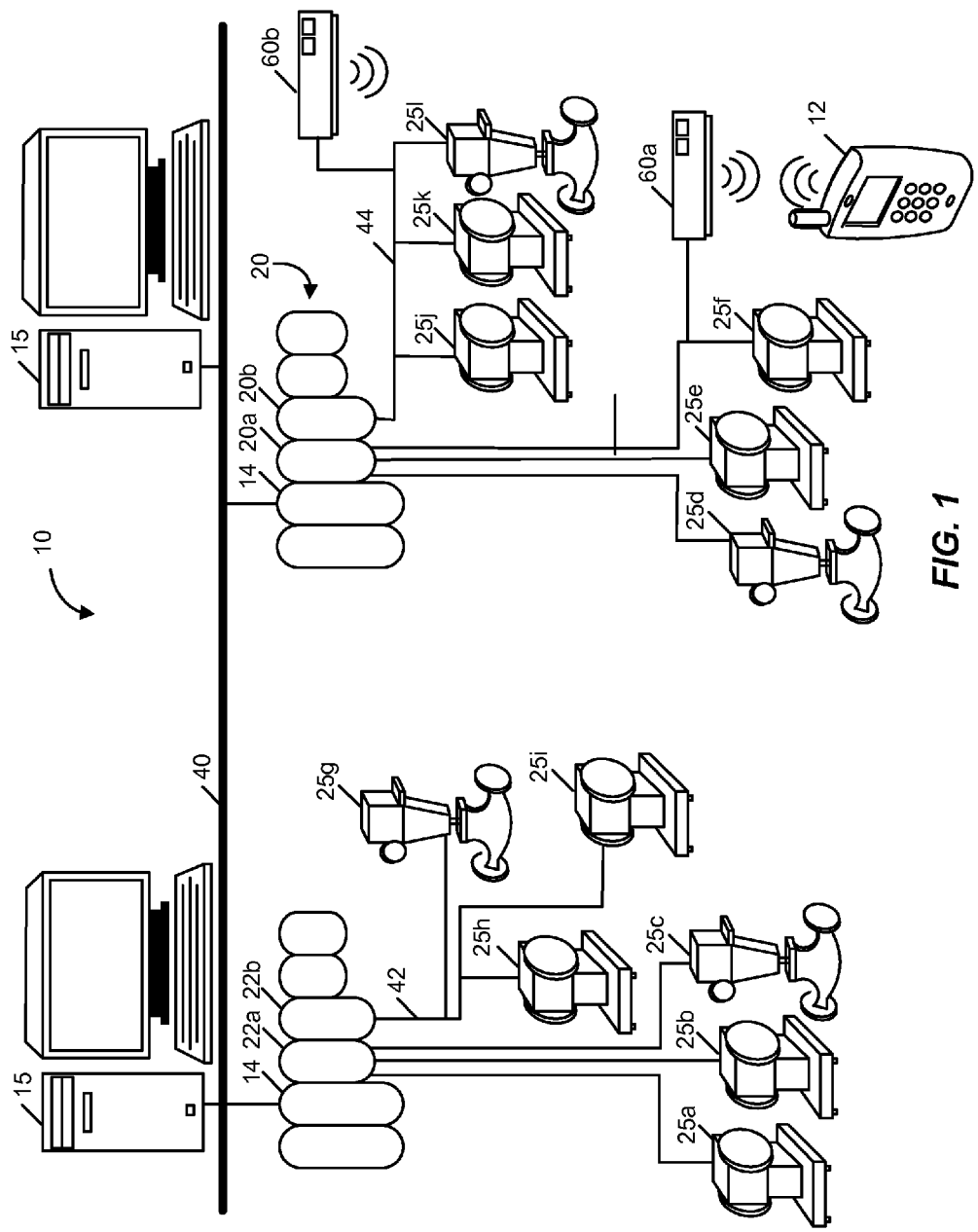

FIG. 1 illustrates an example process control system 10 that includes devices which an operator can control and/or monitor using a portable communicator 12. In the embodiments discussed herein, the portable communicator 12 is equipped with a two-way radio module serviced by a wireless communication stack. The portable communicator 12 is a special-purpose handheld field maintenance device (such as Emerson 475 Communicator) or a general-purpose portable device such as a smartphone or a PDA that includes software components that allow software applications to directly access the wireless communication stack, so that the applications need not rely on a virtual COM port. In this manner, the operator can access devices easily and quickly.

The process control system 10 includes one or more process controllers 14 connected to one or more host workstations or computers 15 (which may be any type of personal computer or workstation) and connected to banks of input/output (I/O) devices 20, 22 each of which, in turn, is connected to one or more field devices 25. The controllers 14, which may be, by way of example only, DeltaV™ controllers sold by Fisher-Rosemount Systems, Inc., are communicatively connected to the host computers 15 via, for example, an Ethernet connection 40 or other communication link. Likewise, the controllers 14 are communicatively connected to the field devices 25 using any desired hardware and software associated with, for example, standard 4-20 ma devices and/or any smart communication protocol such as the Fieldbus or HART protocols. As is generally known, the controllers 14 implement or oversee process control routines stored therein or otherwise associated therewith and communicate with the devices 25-36 to control a process in any desired manner.

The field devices 25 may be any types of devices, such as sensors, valves, transmitters, positioners, etc. while the I/O cards within the banks 20 and 22 may be any types of I/O devices conforming to any desired communication or controller protocol such as HART, Fieldbus, Profibus, etc. In the embodiment illustrated in FIG. 1, the field devices 25*a*-25*c* are standard 4-20 ma devices that communicate over analog lines to the I/O card 22*a*. The field devices 25*d*-25*f* are illustrated as HART devices connected to a HART compatible I/O card 20A. Similarly, the field devices 25*j*-25*l* are smart devices, such as Fieldbus field devices, that communicate over digital bus 42 or 44 to the I/O cards 20B or 22B using, for example, Fieldbus protocol communications. Of course, the field devices 25 and the banks of I/O cards 20 and 22 could conform to any other desired standard(s) or protocols besides the 4-20 ma, HART or Fieldbus protocols, including any standards or protocols developed in the future.

In an embodiment, each of the controllers 14 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course, hybrid and other types of function blocks also exist. Further, groups of function blocks are referred to as modules. Function blocks and modules may be stored in and executed by the controller 14, which is typically the case when these function blocks are used for, or are associated with standard 4-20 ma devices and some types of smart field devices, or may be stored in and implemented by the field devices themselves, which may be the case with Fieldbus devices. While the description of the control system is provided herein using function block control strategy, the control strategy could also be implemented or designed using other conventions, such as ladder logic, sequential flow charts, etc. and using any desired proprietary or non-proprietary programming language.

When inspecting or setting up new equipment, or when configuring or troubleshooting field devices, operators sometimes must (and often prefer) to physically approach system components and closely observe these components during work. As indicated above, operators can use the portable communicator 12 to establish a short-range wireless connection with one or several components of the system 10. To this end, the system 10 may include one or several access points for wireless access such as wireless modems 60a and 60b. In an example embodiment, the wireless modem 60a includes a wireless interface that operates according to the Bluetooth standard, an adaptor to layer messages of the HART communication protocol over Bluetooth, and a wired interface to exchange messages with the HART device 25f via a corresponding wired connection. As another example, the wireless modem 60b includes a wireless interface that operates according to the Bluetooth standard, an adaptor to layer messages of the Fieldbus communication protocol over Bluetooth, and a wired interface to exchange messages with the Fieldbus devices 25j, 25k, and 25l via the digital bus 44.

Figure 2:
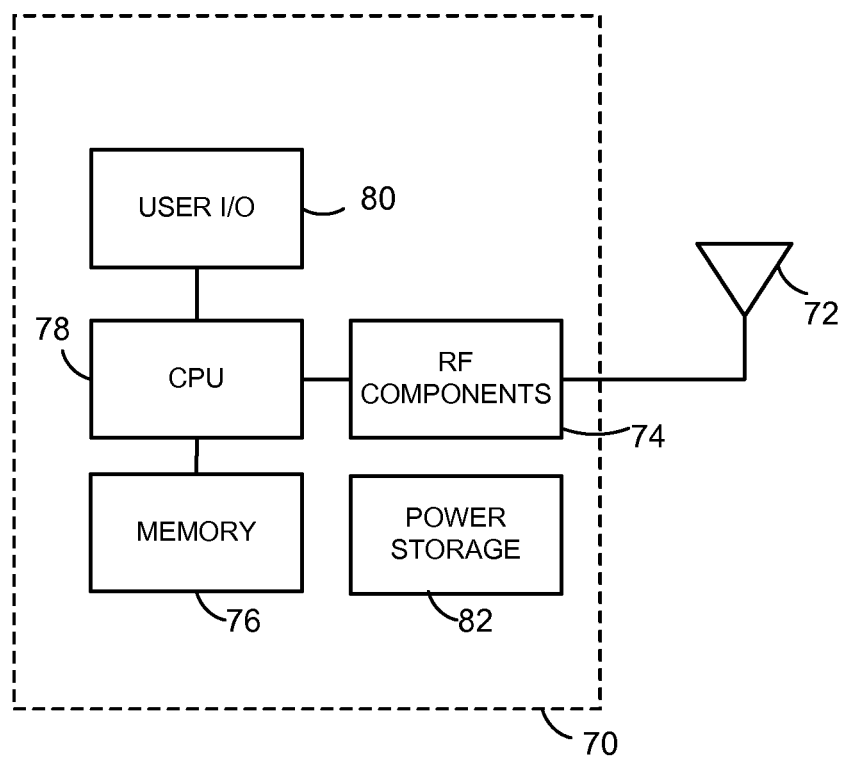
FIG. 2 is a block diagram of an example portable communicator that operates in the system of FIG. 1.

Now referring to FIG. 2, the portable communicator 12 includes an antenna 72, a two-way radio frequency (RF) module 74 (which may include digital signal processing (DSP) components, encoders, modulators, etc.), a computer readable memory 76 to store data and computer programs, and a processing unit 78 to execute these instructions, according to an embodiment. The RF module 74 may support Bluetooth (e.g., Bluetooth version 1.2 ratified in 2005 as the 802.15.1 protocol), IrDA (e.g., IrDA Physical Layer Specification v1.4, IrDA Link Access Protocol v1.1, IrDA Link Management Protocol v1.1), or another communication protocol or standard. In some embodiments, the RF module 74 communicates in accordance with a protocol ratified as one of IEEE 802.11 (e.g., IEEE 802.11-2007) or 802.15 standards, for example. More generally, the RF module 74 may operate in accordance with one or more suitable wireless local area network (WLAN), wireless personal area network (WPAN), near field communication (NFC), etc. standards. The processing unit 78 is also coupled to a system 80 for receiving and providing user input and output, respectively. Depending on the embodiment, the system 80 includes one or more of a keypad, a pointing device, a screen or touch-screen. Further, the portable communicator 12 may include a local power storage module 82 such as replaceable batteries, for example. In some embodiments, the portable communicator 12 complies with intrinsic safety requirements to be used safely on oil rigs or in oil refineries, for example.

As discussed in more detail below, the programs stored on the computer readable memory 76 may include software components to enable the portable communicator 12 to transmit messages according to one or more industrial automation protocols such as HART, Fieldbus, or Profibus over the communication protocol supported by the RF module 74. Next, a prior art software system in which an application communicates via a wireless communication link using a virtual COM port is discussed with reference to FIG. 3A, followed by a discussion of an efficient system of FIG. 4 in which an application accesses a wireless communication stack directly, e.g., without using a virtual COM port. The software systems illustrated in FIGS. 3A and 4 may be implemented in a device such as the portable communicator 12.

Figure 3A:
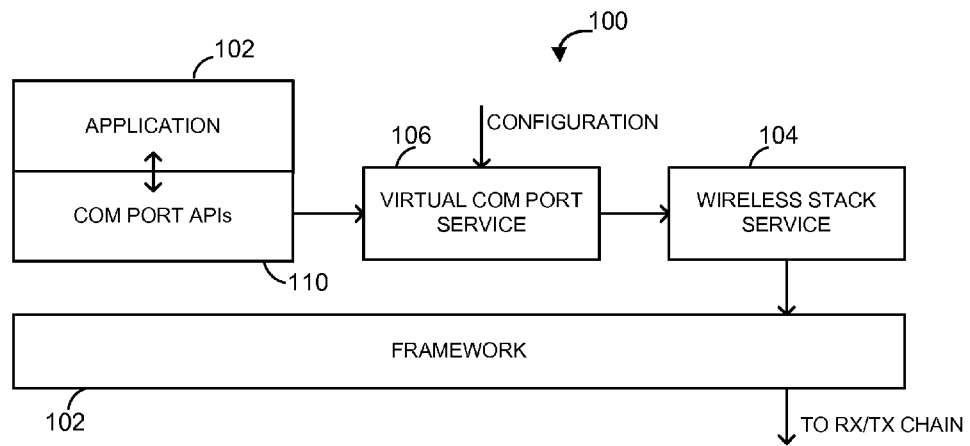
FIG. 3A is a block diagram of a prior art software system in which an application communicates process control or monitoring information via a wireless communication link.

First referring to FIG. 3A, a system 100 includes a software framework 102 to supports a wireless stack service 104 that services a wireless communication stack such as Bluetooth, a virtual COM port service 106 that services one or more virtual COM ports, an application 108 for monitoring and/or controlling components of a process control system using an industrial automation protocol such as HART, and possibly other services and applications. The software framework 102 may include an operating system such as Windows Mobile, Symbian, or Android, for example. In general, the software framework 102 provides access to physical and logical resources of the portable communicator as well as basic services such as file system manipulation, access to user input and output devices, etc. In some embodiments, the wireless stack service 104 is integral with the software framework 102. Along with the corresponding hardware components, the software framework 102 defines the platform of a portable communicator.

To use the wireless communication stack serviced by the wireless stack service 104, the application 108 invokes one or more COM port APIs 110 to interact with a virtual COM port which the virtual COM port service 106 emulates. However, a user must activate the wireless stack service 104, configure the virtual COM port service 106 (and, in some cases, the wireless stack service 104), establish a wireless connection with a target device, and instruct the application to associate the virtual COM port with the target device. Only after the user completes these configuration steps can the application 102 begin to exchange monitoring and/or control information with the target device.

Figure 3B:
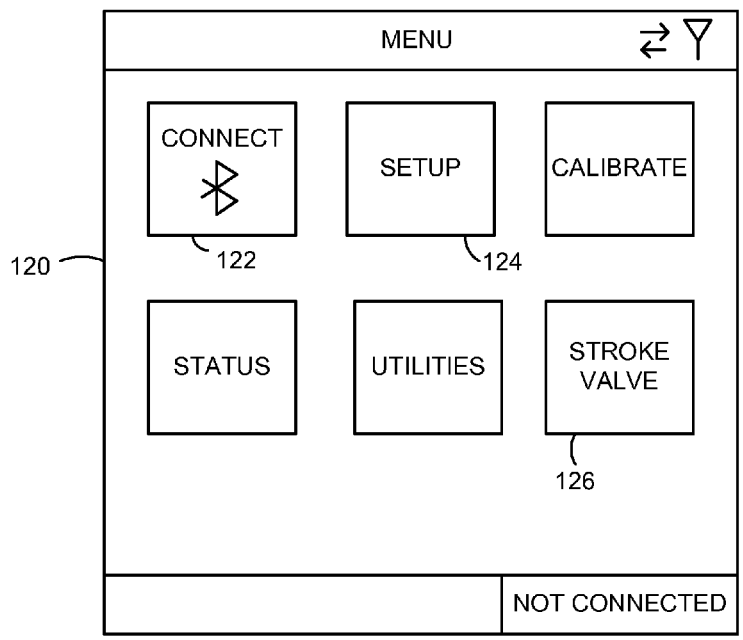
FIG. 3B is an example interface screen of a portable device via which a user may invoke set-up and configuration functions.

As indicated above, this set-up and configuration procedure is time-consuming and error-prone. For example, referring to an example touchscreen interface screen 120 depicted in FIG. 3B, a user must activate the "connect Bluetooth" utility via a control 122, follow the steps associated with the Bluetooth setup procedure on the corresponding platform, and begin a virtual COM port setup procedure by operating a control 124. To conduct a valve stroke test, for example, the user may then operate a control 126 to invoke the appropriate software application. The application typically displays dialogues to allow the user to configure a set up a wireless connection via the virtual COM port and the Bluetooth link configured using the controls 124 and 122, respectively.

Moreover, the configuration problems outlined above often are compounded by differences in implementation of the wireless communication stack by different vendors and, more particularly, by differences in configuration utilities. For example, some vendors require that a user set up the virtual COM port before starting the application that will utilize the port, while other vendor require that these steps be performed in the reverse order.

Figure 4:
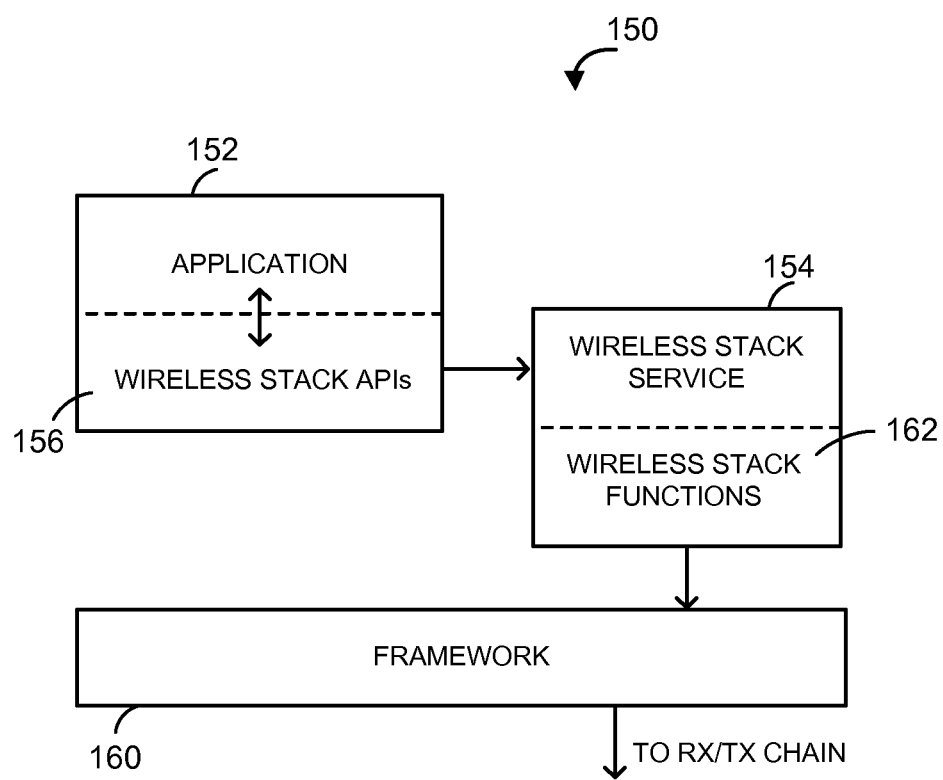
FIG. 4 is a block diagram of an example software system in which an application directly interacts with a wireless communication stack to communicate process control or monitoring information.

By contrast, a system 150 illustrated in FIG. 4 includes an application 122 that directly interacts with a wireless stack service 124 via a set of APIs 126, and therefore does not require the complex configuration associated with a virtual COM port. The application 152 can directly interact with a wireless stack service 154 using a set of wireless stack APIs 156. More specifically, the application 152 may transmit messages according to an industrial automation protocol such as HART, Fieldbus, Profibus, etc. over the wireless communication stack supported by the portable communicator. In an embodiment, the application 122 is ValveLink Mobile, sold by Emerson Process Management, that provides local configuration, calibration, monitoring, and diagnostics of a valve.

Referring back to FIG. 2, the wireless stack service 124 may control the RF module 74 which may be a Bluetooth radio, an IrDA communication module, etc. The software components 152, 154, 156, and 162 may be stored in the memory 76 and executed by the CPU 78.

In some embodiments, the APIs 156 are a set of functions exposed by the wireless stack service 154, i.e., functions provided by the developer of the wireless stack service 154 for sending and receiving data. In other embodiments, the APIs 156 include "wrappers" of the APIs exposed by the wireless stack service 154 to define a porting layer between the application and the wireless communication stack. In one embodiment, for example, the APIs 156 are provided as a separate software component such as a dynamic-link library (DLL) for use by multiple applications.

In one example implementation, the APIs 156 support network socket communications. The APIs may define a set of platform-independent functions and include, for example, an API for creating a new stream-oriented network socket or a new datagram-oriented socket, an API for reading data from a network socket or writing data to a network socket, an API for closing a specified network socket, etc. The APIs 156 may be similar to a Berkeley socket function library, for example.

In the example system 150, the application 152 and the wireless stack service 154 are separate tasks (e.g., processes, threads) that interact using an inter-process communication (IPC) mechanism provided by a framework 128. For example, the framework 128 may provide messaging, a mechanism to exchange information via a shared memory region, etc. Accordingly, the interaction between the application 152 and the wireless stack service 154 may include asynchronous function calls. However, the wireless stack functions 162 of the wireless communication stack 154 in other embodiments may be executed on the call stack of the application 152. In other words, the application 152 may call the functions 162 directly (or via the APIs 156) in a synchronous manner. In at least some of these embodiments, the wireless stack service 154 is not executed as a separate task.

On the other hand, in other embodiments, the wireless stack APIs 156 may interact with another task that serves as an interface between the application 152 and the wireless stack service 154. In general, it will be understood that a direct interaction between the application 152 and the wireless stack functions 162 may be implemented via function calls on the same call stack or separate call stacks, and using one or several tasks, according to the implementation (which in turn may depend on the requirements of the framework 160).

To implement direct access to the wireless communication stack, the application 152 and/or the wireless stack APIs 156 may provide the functionality of a driver of the industrial automation protocol used by the application 152. For example, if the application 152 uses HART to monitor or control a field device, the wireless stack APIs 156 may be defined on a per-command basis to emulate the timing, blocking, and other attributes of a HART connection. Thus, the wireless stack APIs 156 recognizes and, in some of these embodiments, partially executes (e.g., provides a return code, a progress indication, a scheduling indication, etc.) the received HART command so as to present a HART communication link to the application 152. As a more specific example, one of the wireless stack APIs 156 may implement the formatting and transmission of HART command 0 (zero) that causes the receiving HART device to reply with the expanded device type code, revision levels, and the device identification number. The API may format the command, cause the formatted command to be transmitted over the wireless communication stack, ensure the proper timing and blocking, etc. In an embodiment, the API also implements a state machine to process the response to HART command 0, check for errors, etc. In another embodiment, the API returns control to the calling application 152 immediately after transmitting the HART command over the communication stack, and another software component (e.g., a thread) receives and processes a notification from the wireless stack service 154 that a response has been received. The response (or the notification) is then forwarded to the application 152.

In general, the wireless stack APIs 156 (and, in some embodiments, a component running as a separate task in the framework 160 to facilitate direct access of the application 152 to the wireless communication stack serviced by the wireless stack service 154) provides a communication scheme associated with an industrial automation protocol (e.g., a master-slave configuration) that is typically not provided by the communication stack of the portable communicator. For example, the Bluetooth standard, as is known, does not provide a master-slave communication protocol.

Further, in some embodiments, the application 152 and/or the wireless stack APIs 156 utilize the wireless stack 154 so as to allow other services or applications to invoke wireless stack functionality. For example, if the system 150 is implemented on a smartphone and the wireless stack service 154 operates according to the Bluetooth standard, the application 152 uses only some of the resources of the wireless stack service 154, and the wireless stack 154 can transmit audio to the user's headphones, for example, while simultaneously communicating with a field device.

In some embodiments, the wireless stack APIs 156 may provide additional functionality such as automatically turning on the RF module 74 (see FIG. 2) by transmitting the appropriate command to the wireless stack service 154, for example, when the user launches the application 152. In this manner, the configuration is further simplified, and the operator need not remember to activate the wireless link prior to using the application.

Further, the wireless stack APIs 156 may automatically determine the type (e.g., manufacturer, version) of the wireless stack service 154, and automatically select the appropriate configuration options. For example, a certain wireless stack API may query the framework 160 to determine whether the Bluetooth communication stack is a Microsoft stack or a Widcomm stack and, depending on the result of the query, select the appropriate sequence for automatically establishing a connection between the application 152 and the wireless stack service 154.

In an embodiment, the wireless stack APIs 156 allow the application 152 to automatically discover devices that support HART, Fieldbus, or another industrial automation protocol used by the application 152. For example, the application 152 may automatically discover HART Bluetooth modems that operate within the range of the portable communicator. The user may then select the device to which he or she wishes to connect from the list automatically generated upon launching the application 152. Further, the wireless stack APIs 156 may automatically attempt to establish a connection with known field devices. Moreover, if desired, the wireless stack APIs 156 may allow the application to automatically reestablish lost connections.

Further, in some embodiments, the application 152 and/or the wireless stack APIs 156 filter out all proximate Bluetooth devices that are not HART Bluetooth modems. To this end, the application 152 may, for example, cause the wireless stack service 154 to discover all Bluetooth devices, transmit a command via the corresponding Bluetooth link to determine whether the peer devices is a HART device, and cause the wireless stack service 154 to delete the device from the list of discovered devices if no response to the command is received, or if the received response indicates that the device is not a HART device.

In an embodiment, the application 152 and/or the wireless stack APIs 156 implement automated power management so that the RF module 74 efficiently uses the power storage 82 (see FIG. 2). If, for example, the application 152 reads periodic update data from a HART sensor coupled to a HART Bluetooth modem, the application 152 can turn on the Bluetooth RF module 74 (via the wireless stack service 154, for example) in accordance with the periodic update schedule (e.g., once every two seconds for a 50-millisecond period).

If desired, the application 52 in some embodiments causes the wireless stack service 154 to turn off the RF module 74 after the user terminates the application 152, provided no other services or application running on the portable communicator are using the wireless stack service 154. Thus, the user need not remember to turn off the RF module 74 when the wireless link is not in use.

Figure 5:
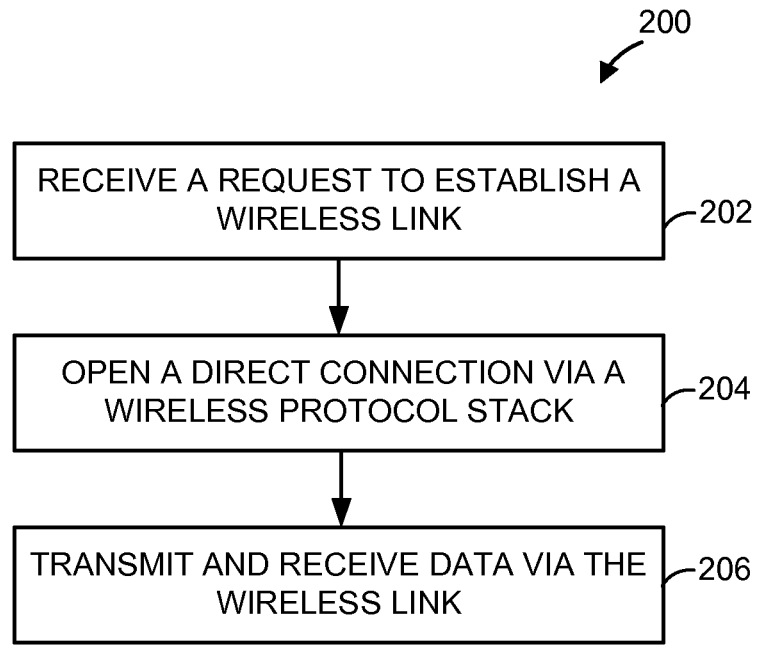
FIG. 5 is a flow diagram of an example method for establishing a direct connection to a wireless communication stack on a portable device.

FIG. 5 is a flow diagram of an example method 200 that may be implemented by the system 150 or a similar software system running on a portable communicator that provides direct access to a wireless communication stack. At block 202, a request to establish a wireless connection to a remote device for exchanging process control and/or monitoring information is received. For example, when a user launches an application such as ValveLink Mobile, the application may automatically originate the request. Depending on the embodiment, the request may be processed by the layer of wireless stack APIs executing on the call stack of the application or in a separate task. Next, at block 204, a wireless link is directly set up using the APIs exposed by the wireless protocol stack, for example. In an embodiment, the application launches a state machine to control the timing, blocking, and other parameters of a connection associated with an industrial communication protocol such as HART and established via a general-purpose wireless link such as Bluetooth. Next, at block 206, process control and/or monitoring data is exchanged via the wireless link. Thus, the application may emulate a HART communication link using Bluetooth stack APIs.

Figure 6:
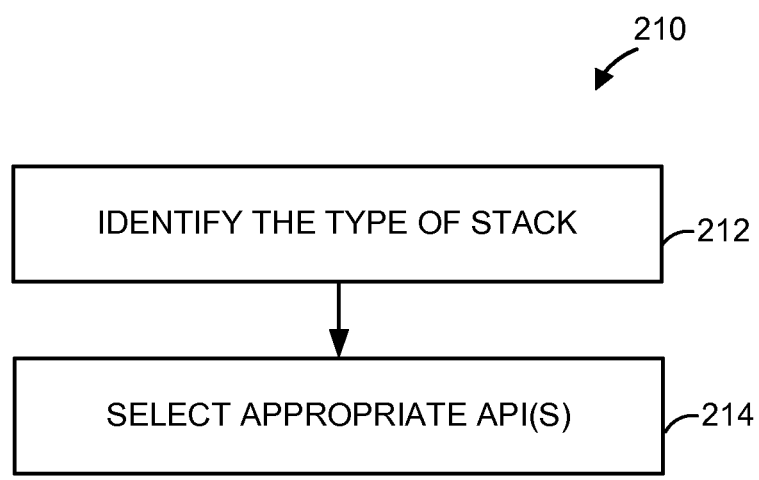
FIG. 6 is a flow diagram of an example method for configuring a direct connection to a wireless communication stack on a portable device.

FIG. 6 is a flow diagram of an example method 210 that an application can execute as a part of the method 200, for example, to further simply configuration of a portable communicator. At block 212, the type of the wireless communication stack (e.g., Bluetooth) is determined. To this end, a query may be transmitted to the wireless stack service and the corresponding response may be processed. The query may report, for example, the manufacturer and the version of the software of the wireless stack service. Next, at block 214, appropriate APIs may be automatically selected. If, for instance, the wireless stack service identifies itself as a Widcomm stack, Widcomm-specific APIs, state machines, parameters, etc. may be used.

Although the forgoing text sets forth a detailed description of numerous different embodiments of the disclosure, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the invention.

The invention claimed is:

1. A method in a communication device that implements a communication stack to wirelessly communicate with a remote device according to a general purpose wireless communication protocol, wherein the remote device operates in a process control environment, the method comprising:
receiving a request from a software application to establish a wireless communication link with the remote device;
establishing a direct connection between the software component and the communication stack, wherein the direct connection is free of intermediate services; and
communicating process data between the software component and the remote device in accordance with an industrial automation protocol over the wireless communication link;
wherein the wireless communication link utilizes the general purpose wireless communication protocol.

2. The method of claim 1, wherein establishing the direct connection between the software component and the communication stack includes creating a network socket.

3. The method of claim 2, wherein creating the network socket is a stream-oriented socket.

4. The method of claim 1, wherein establishing the direct connection includes not opening a virtual serial port to communicate with the communication stack.

5. The method of claim 1, wherein the general purpose wireless communication protocol conforms to a wireless local area network (WLAN) or a wireless personal area network (WPAN) standard.

6. The method of claim 1, wherein the industrial automation protocol supports a plurality of commands specifically defined for exchanging control or diagnostic data in a process control environment.

7. The method of claim 5, wherein the industrial automation protocol is one of HART of Fieldbus.

8. The method of claim 1, further comprising automatically identifying a type of the communication stack in response to receiving the request from the software component, wherein establishing the direct connection between the software component and the communication stack includes establishing the direct connection in accordance with the identified type;
wherein the type identifies at least of a manufacturer and a version of the communication stack.

9. The method of claim 1, wherein the communication stack operates on a wireless communication module, the method further comprising at least one of:

powering on the wireless communication module in response to receiving the request from the software module; and powering off the wireless communication module in response to detecting that the software module no longer uses the wireless communication link.

10. The method of claim 9, wherein the direct connection is established is established by an Application Programming Interface (API) in a call stack of the software module.

11. The method of claim 1, wherein communicating the process data includes:

receiving one of a plurality of commands associated with the industrial automation protocol; and partially executing the received one of the plurality of commands so as to emulate a physical link that operates according to the industrial automation protocol.

12. A software module for use in a communication device, the communication device having a memory and a processor, wherein the communication device implements a communication stack to wirelessly communicate with a remote device operating in a process control environment according to a general purpose wireless communication protocol, and wherein the software module is stored in the memory as computer-executable instructions and executed by the processor to:

receive a request from a software application executing in the communication device to establish a wireless communication link with the remote device;

establish a direct connection between the software application and the communication stack, wherein the direct connection is free of intermediate services; and communicate process data between the software application and the remote device in accordance with an industrial automation protocol over the wireless communication link;

wherein the wireless communication link utilizes the general purpose wireless communication protocol.

13. The software module of claim 12 implemented as dynamic-link library (DLL).

14. The software module of claim 12, wherein the DLL is executed in a call stack of the software application.

15. The software module of claim 12, wherein the DLL implements a plurality of API functions, each corresponding to a respective one of a plurality of commands of the industrial automation protocol.

16. The software module of claim 12, wherein the software module is executed in a call stack of a dedicated service that executes as a process separate from the software application.

17. The software module of claim 12, wherein the direct connection is free of a virtual serial port associated with the communication stack.

18. The software module of claim 12, wherein the direct connection includes a network socket.

19. The software module of claim 12, wherein the general purpose wireless communication protocol conforms to a wireless local area network (WLAN) or a wireless personal area network (WPAN) standard; and the industrial automation protocol supports a plurality of commands specifically defined for exchanging control or diagnostic data in a process control environment.

20. A communication device comprising:

a processor;

a wireless communication module configured to establish a wireless communication link between the communication device and a remote device operating in a process control environment, wherein the wireless communication link operates according to a general purpose wireless communication protocol; and a memory to store computer-executable instructions that include:

a communication stack that implements the general purpose wireless communication protocol; and a software module executable by the processor and configured to (i) establish a direct connection between the communication stack and a software application executed by the processor in response to a request from the software application, wherein the direct connection is free of intermediate services, and (ii) communicate process data between the software application and the remote device in accordance with an industrial automation protocol over the wireless communication link using the wireless communication link.

21. The communication device of claim 20, wherein the software module is implemented as dynamic-link library (DLL).

22. The communication device of claim 20, wherein the DLL implements a plurality of API functions, each corresponding to a respective one of a plurality of commands of the industrial automation protocol.

23. The communication device of claim 20, wherein the software module is further configured to selectively power on the wireless communication module according to whether the software application is transmitting or receiving process data.

24. The communication device of claim 20, wherein the software application is configured to receive diagnostic data from the remote device, transmit control data to the remote device, or both.

25. The communication device of claim 20, wherein the software module is further configured to automatically identify a type of the communication stack, wherein type identifies at least of a manufacturer and a version of the communication stack.

26. The communication device of claim 20, wherein software module is configured to establish the direct connection free of configuration of a virtual serial port.

* * * * *